United States Patent [19]

Boasson

[11] Patent Number: 4,809,496
[45] Date of Patent: Mar. 7, 1989

[54] LOCKING MEANS FOR JOINING TWO OR MORE MEMBERS, SUCH AS FOR INSTANCE A CHAIN END AND LINKS OF AN ENDLESS CHAIN

[76] Inventor: Ragnar T. Boasson, Joklasel 23, 112 Reykjavik, Iceland

[21] Appl. No.: 69,756

[22] Filed: Jul. 6, 1987

[30] Foreign Application Priority Data

Jul. 4, 1986 [IS] Iceland .................................. 3121

[51] Int. Cl.$^4$ .............................................. F16G 15/04
[52] U.S. Cl. ................................................ 59/93; 59/84; 59/78; 152/233; 24/299; 24/116 R
[58] Field of Search ...................... 59/93, 85, 86, 87; 152/231, 233, 241; 474/218, 116 R; 24/299, 573

[56] References Cited

U.S. PATENT DOCUMENTS

| | | | |
|---|---|---|---|
| 2,617,464 | 11/1952 | Trumbull | 152/241 |
| 3,044,521 | 7/1962 | St. Pierre | 152/241 |
| 3,174,273 | 3/1965 | Ehmann | 59/93 |
| 3,613,355 | 10/1971 | Gower | 24/116 R |
| 3,665,562 | 5/1972 | Gower | 24/116 R |
| 3,901,024 | 8/1975 | Ratcliff | 59/93 |

FOREIGN PATENT DOCUMENTS

| | | | |
|---|---|---|---|
| 824417 | 11/1951 | Fed. Rep. of Germany. | |
| 386865 | 4/1965 | Switzerland | 152/231 |

*Primary Examiner*—David Jones
*Attorney, Agent, or Firm*—Cushman, Darby & Cushman

[57] ABSTRACT

A mechanism for joining a chain end to a chain link utilizes a sliding link connected to a first link of the chain. The sliding link can be disengaged only by displacing it onto the straight portion of the first link and moving it forwardly to a second position. For connection, the sliding link is moved about the straight portion to a third position and is then moved upon engagement of a second chain link by an opposite displacement back to the locking position. Thus locking and unlocking is achieved only by two specific movements of the sliding link. Inadvertent unlocking is prevented by the shape and position of the sliding link.

6 Claims, 5 Drawing Sheets

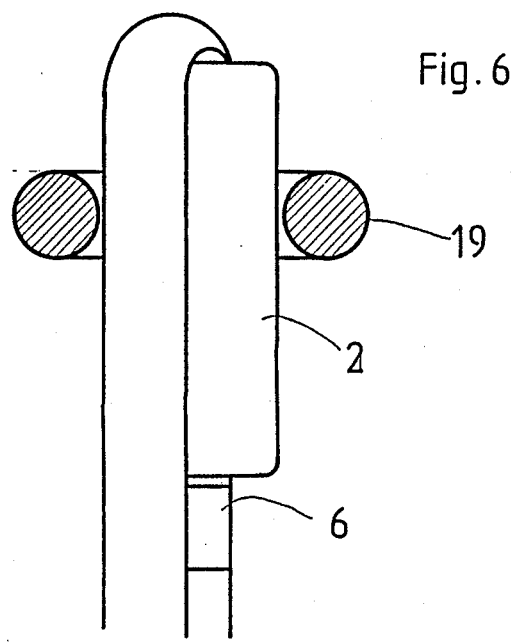
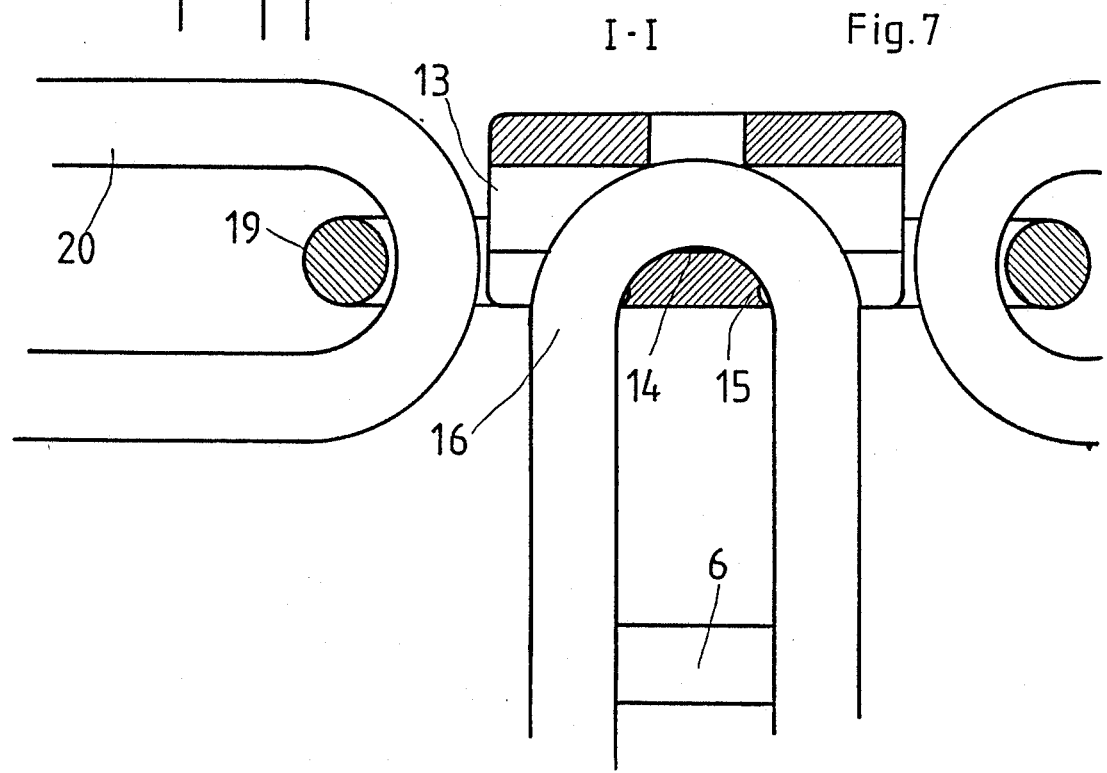

LOCKING MEANS FOR JOINING TWO OR MORE MEMBERS, SUCH AS FOR INSTANCE A CHAIN END AND LINKS OF AN ENDLESS CHAIN

TECHNICAL FIELD

The invention relates to a locking means for joining two or more members, such as for instance a chain end and links of an endless chain.

BACKGROUND ART

It is known to use various types of chain lock-screw mechanisms for joining two members, such as a chain end and links of an endless chain.

These known locks are encumbered with the drawback that they require the use of particular implements, such as a spanner or the like particular implement, for the joining. When the locks for instance have been subjected to sea water or another corrosive environment it is often difficult to engage and disengage the locks. This is considered an essential disadvantage, especially at the places of work involving engaging and disengaging of many locks in a short time, e.g. on board fishing vessels employing a high number of locks, e.g. at the joining of the so-called fishing-line attached to trawl net to the opening of the net.

German patent specification No. 824,417 discloses the use of a short bar secured to a chain end and situated along the chain end in question under a displacement through a second chain link and subsequently transversely turned at the securing procedure.

SUMMARY OF THE INVENTION

The object of the invention is to provide a locking means of the above type which is both reliable and can be manually connected to a second chain, chain link or another member without the use of implements, and which can be disengaged again in the same manner.

The locking means according to the invention is characterized in that the locking means comprises a first link of the chain links and a sliding link connected to the first chain link in such a manner that it is only possible to disengage the sliding link by displacement thereof onto the straight portion of the first chain link and forwards to a second position and subsequently by turning about the straight portion of the first chain link into a third position, and upon engagement of a second chain link of the endless chain by an opposite displacement back to the locking position.

As a result the locking means can in a simple manner be engaged and disengaged from its locking position. The latter is due to the fact that the sliding link merely need be moved in a specific direction and subsequently in a second specific direction. As a result a high reliability is simultaneously achieved as it is almost impossible for the lock per se to be disengaged due to its shape and position.

The locking means according to the invention may further be characterized in that from the locking position the sliding link is turned 90° about the first axis of rotation perpendicular to the longitudinal axis of the first chain link and displaced along the straight portion into the second position in which it is turned 90° about the axis of the straight portion.

In addition the locking means may be characterized in that the sliding link is plateshaped and comprises an opening receiving the body of a first chain link, the opening at the opposite end being widened by means of a recess to one side. In this manner it is only possible to turn the sliding link in a specific direction about the narrow curved portion of the chain link. At the same time, the sliding link is prevented from being movable in more than on direction in the locking position. THis occurs because the distance between the two straight portions is smaller than the length of the opening receiving the chain link.

Furthermore according to the invention the straight portion of the chain link may in the middle be stationarily connected to a traverse dividing the chain link into two portions. As a result, the chain link can only be moved into the surrounding opening of the chain link on one side. Furthermore this connection has the purpose of preventing a turning of the sliding link when the bar engages clearances in the opening of the sliding link. Because of the placement of the traverse in a certain distance, from the curved portion slightly greater than the length of the sliding link it is only possible to turn the sliding link about the straight portion in one position.

BRIEF DESCRIPTION OF THE DRAWINGS

The invention will be described in greater detail below with reference to the accompanying drawings, in which FIG. 6 is a front view of the locking means in the third position, FIG. 7 is a sectional view taken along the line I—I of FIG. 1

DESCRIPTION OF PREFERRED EMBODIMENTS

Figure 1:
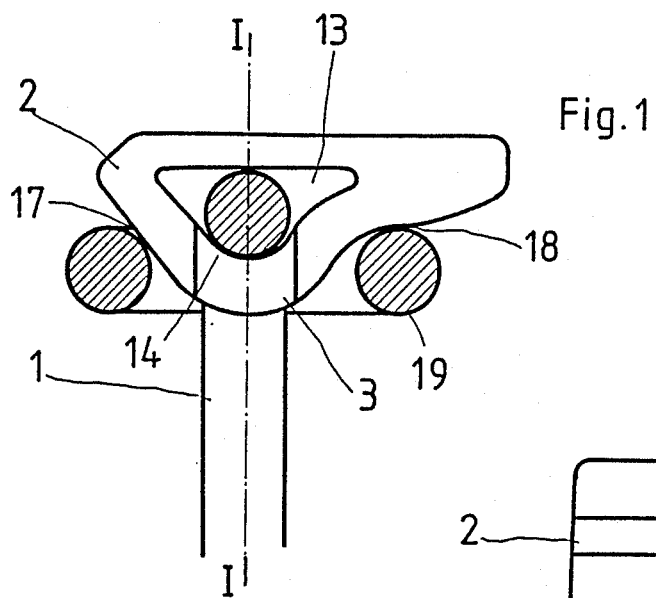
FIG. 1 is a side view of the locking means in the locking position, partly in section.

FIGS. 1 to 7 illustrate an embodiment of a locking means for joining two or more members, such as a chain end a links of an endless chain. The locking means comprises substantially two members, viz. a sliding link 2 and chain links 1 extending through an opening 13 of the sliding link 2. The sliding link is provided with two clearances 3, 4 forming a passage between the opening and one side of the chain link 19 at each end of the opening. The sliding link is further provided with a recess 12 adjacent one side of one of the clearances. Because of this recess it is only possible to turn the sliding link about one certain straight portion of the sliding link because the recess is necessary for the sliding link to be turned close enough to the chain link so that it can be fed through a chain link as shown on FIG. 5 and 6.

Figure 2:
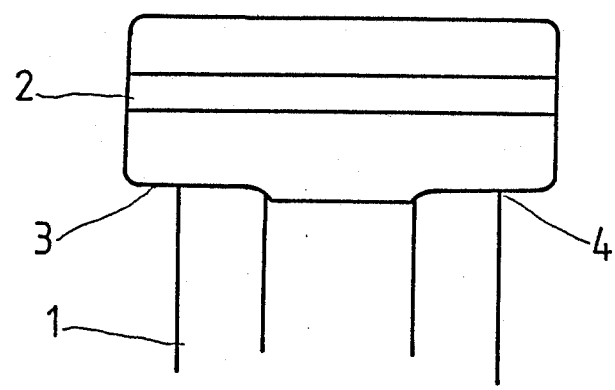
FIG. 2 is a front view of the locking means of FIG. 1.
Figure 3:
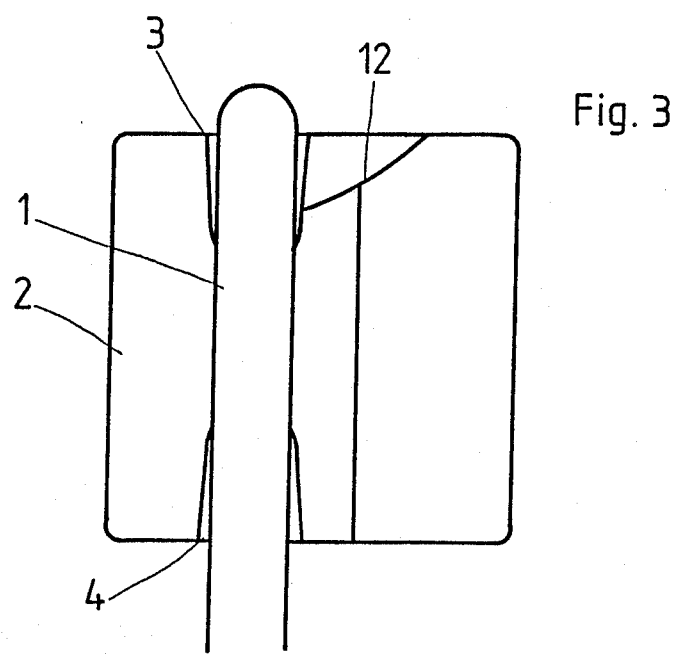
FIG. 3 is a side view of the locking means in another position.
Figure 4:
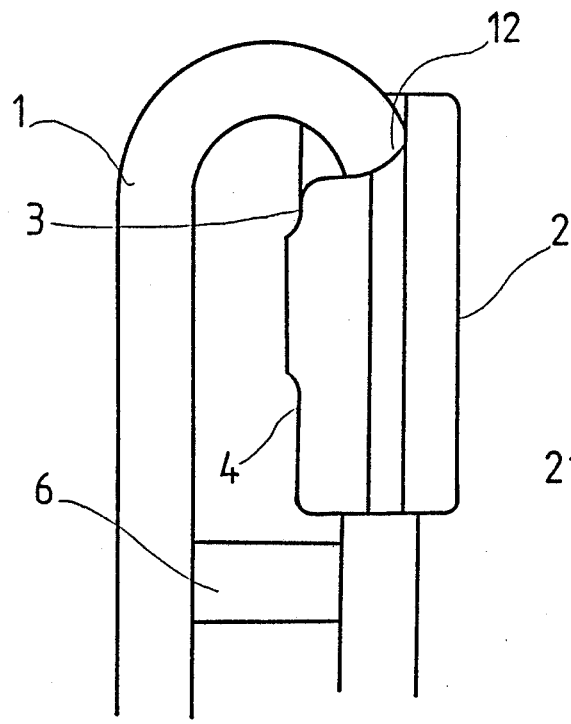
FIG. 4 is a front view of the locking means of FIG. 3.

The clearances 3 and 4 imply that in the locking position, cf. FIGS. 1, 2, and 7, it is only possible to move the sliding link along the curved portion 11 of the chain link provided said sliding link 2 is specifically positioned relative to the chain link 1, viz. a position in which the inner side 14 of the curved portion of the chain link is closely abutting the inner rim 15 of the opening 13 of the sliding link at the bottom of the clearances 3, 4.

It is only possible to engage and disengage the sliding link 2 from the locking position when it is in the above position. While the sliding link is moved along the curved portion of the chain link, the side surfaces 8 of the clearances 3, 4 tightly abut the side surfaces 16 of the chain link on each side thereof and thereby prevent a turning of the sliding link about the chain link.

It is only possible to turn the sliding link 2 about the chain link when the link 2 is present on a straight portion 10 of the chain link 1. When the sliding link is moved too far along the straight portion of the chain link, the clearances 3, 4 engage a cross bar 6 on the chain link, which prevents a turning of the sliding link about the straight portion. Similarly, one of the clearance 3, 4 engages the curved portion of the chain link if the sliding link is not carried sufficiently far along the straight portion, and thus prevents turning of the sliding link about the straight portion.

Figure 5:
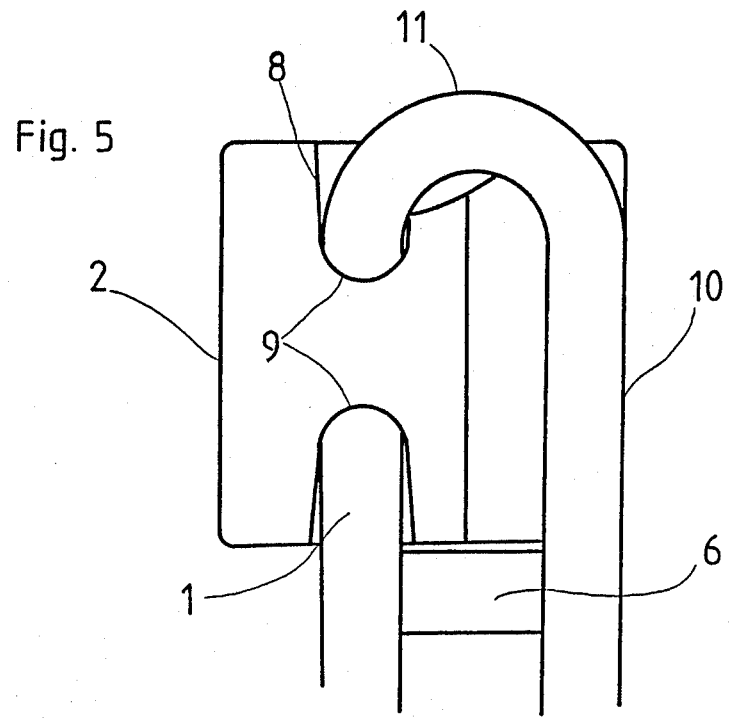
FIG. 5 illustrates the locking means in a third position, in which a joining with other links is allowed.

When the locking means is to be connected to another chain the sliding link is put into the position as shown in FIG. 5 and 6 and fed through one chain link 19. The locking means is then turned 90° about the straight portion 1 to the position shown in FIG. 3 and 4 and moved about the curved portion to the locking position shown in FIG. 1 and 7. The sides 17, 18 of the sliding link touch the sides of the chain link.

Figure 8:
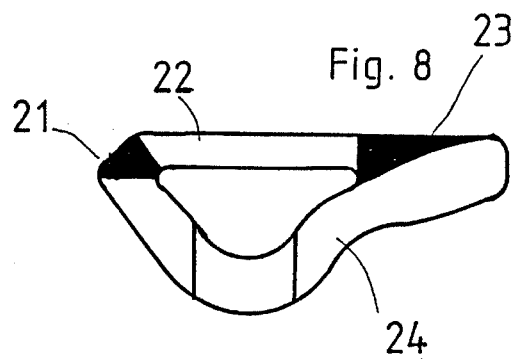
FIG. 8 is view of weldings of the slide link.

FIG. 8 shows how the sliding link can be formed from two parts 22, 24 welded together at 21, 23.

Figure 9:
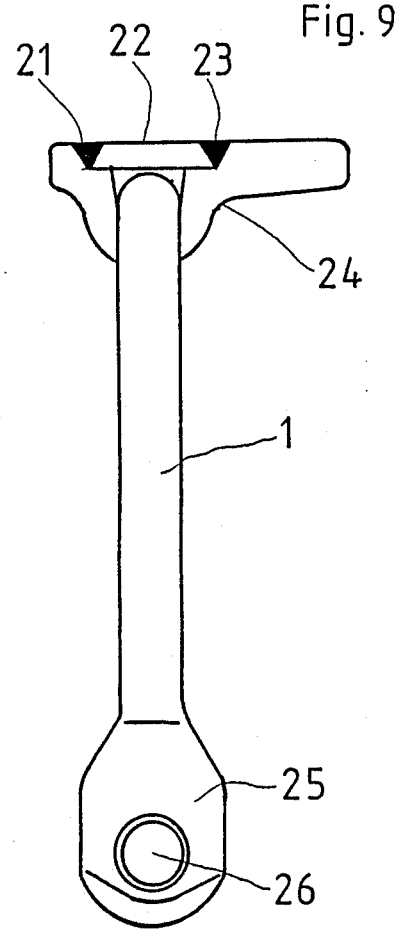
FIG. 9 is a front view of one example of completed locking means.
Figure 10:
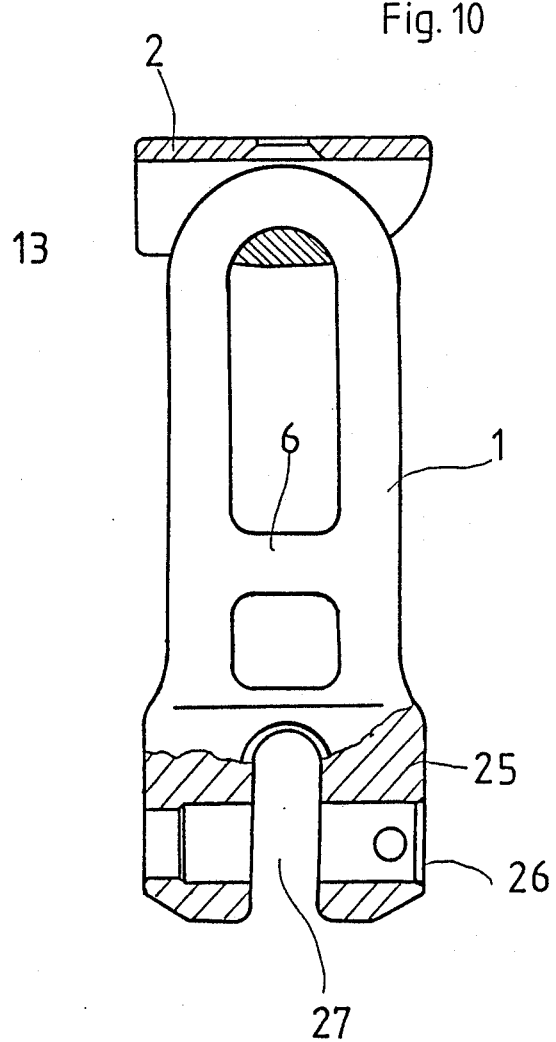
FIG. 10 is a side view from FIG. 9.

FIG. 9 and 10 illustrate the locking means arrangeded with a slit 27 for inserting a chain link or other for permanent connection.

The locking means is made of material of high strength as steel, and the sliding link made of two pieces welded together around the chain link.

The invention is not limited to the above embodiments but may be varied in many ways without thereby deviating from the scope of protection.

I claim:

1. A locking device for joining two or more members comprising:
   a first link member having first and second longitudinal link arms, each said longitudinal link arm having a longitudinal axis;
   a transverse link arm extending between first longitudinal ends of said longitudinal link arms so as to define a substantially U-shaped link element, said transverse link arm having a longitudinal axis and having a longitudinal length less than a longitudinal length of at least one of said longitudinal link arms;
   a sliding link coupled to said first link member and including a main body member having a longitudinal axis, an aperture defined in said main body member having a longitudinal axis parallel to said longitudinal axis of said main body member, said U-shaped link element being slidably disposed in said aperture so that said sliding link is longitudinally slidable in a first angular orientation along each said longitudinal link arm and said transverse link arm;
   means for preventing rotation of said sliding link about the longitudinal axis of said transverse link arm; and
   means allowing rotation of said sliding link about the longitudinal axis of one of said longitudinal link arms.

2. A locking device as in claim 1, wherein said means for preventing comprise side surfaces of openings defined at each longitudinal end of said aperture, said openings sized and shaped so as to prevent rotation of said sliding link about the longitudinal axis of said transverse link element.

3. A locking device as in claim 1, wherein said means allowing rotation comprises a recess defined in one of said side surfaces so as to allow rotation in a first direction about a longitudinal axis of at least one of said longitudinal link arms.

4. A locking device as in claim 3, further comprising means for limiting the rotation of said sliding link about said longitudinal link arm.

5. A locking device as in claim 4, wherein said means for limiting rotation comprise a flange element defined on said main body member which engages the other of said longitudinal link arms when said sliding link si rotated about the longitudinal axis of said one longitudinal link arm whereby rotation of said sliding link about said one longitudinal link arm is limited to 90°.

6. A locking device as in claim 1, further comprising a cross bar element mounted to and extending between said longitudinal link arms for limiting sliding movement of said sliding link along the longitudinal axes of said longitudinal link arms.

* * * * *